United States Patent [19]

Fujiwara

[11] Patent Number: 5,141,282
[45] Date of Patent: Aug. 25, 1992

[54] FRONT GRILL FITTING STRUCTURE OF AN AUTOMOBILE

[75] Inventor: Kiyohiro Fujiwara, Washizu, Japan

[73] Assignee: Suzuki Motor Corporation, Shizuoka Pref, Japan

[21] Appl. No.: 673,142

[22] Filed: Mar. 19, 1991

[30] Foreign Application Priority Data

Aug. 7, 1990 [JP] Japan .................................. 2-83705

[51] Int. Cl.⁵ .............................................. B60R 19/52
[52] U.S. Cl. .................................... 296/194; 293/115; 180/68.6
[58] Field of Search ................. 296/1.1, 194; 293/115; 180/68.6

[56] References Cited

U.S. PATENT DOCUMENTS 4,354,566 10/1982 Yuda ................................. 293/115 X

FOREIGN PATENT DOCUMENTS 103453 7/1989 Japan .

Primary Examiner—Margaret A. Focarino
Assistant Examiner—Andrew C. Pike
Attorney, Agent, or Firm—McGlew & Tuttle

[57] ABSTRACT

According to the present invention, there is provided a front grill fitting structure of an automobile in which clips are installed on an inner face of an upper part of an opening hole formed on a front panel and an upper part of a front grill is fitted to these clips, wherein each clip is composed of U-shaped plates having a pair of opposite faces, a projected part projecting to the inner face side on either one of the opposite faces is formed, and engagement holes which are engaged with the projected parts are formed on the upper face of the front grill, and the upper face of the front grill is inserted between mutual opposite faces of the clips in fitting the front grill. Thus, there is provided a front grill fitting structure of an automobile in which it is possible to perform positioning of the front grill surely because the clips fix the front grill without deformation, and positioning of the front grill in front and in the rear and right and left may also be made easily because the projected parts of the clips are engaged with the engagement holes of the front grill.

2 Claims, 6 Drawing Sheets

FRONT GRILL FITTING STRUCTURE OF AN AUTOMOBILE

FIELD OF THE INVENTION AND RELATED ART STATEMENT

The present invention relates to a front grill fitting structure of an automobile.

At a front part of an automobile, a front grill 101, in which an air suction hole 100 such as shown in FIG. 6 is formed, is loaded at front opening part 103 of a front panel 102 for the purpose of cooling a radiator.

This front grill 101 is normally held at two positions with clips 104 on both sides of the upper part thereof, at three portions with screws 105 at the center of the upper part and on both sides of the lower part, and at two positions with clips 104 at the central part of the lower part. The front grill 101 is thus fitted to the front panel 102.

As shown in FIG. 7 thru FIG. 11, each of the clips 104 is provided with plates 107 each having a U-shaped section on both sides, and a locking piece 108 which is bent to show an inverted U-shaped section is provided at the center thereof. Further, on upper surfaces of the plates 107, locking portions 109, which are inserted into holes 102a on the underside of the front panel 102, are provided.

The front grill 101 is fitted to the clips 104 in such a manner that swelled portions 111 are provided on a flange portion 110 on the upper part of the front grill 101, and the flange portion 110 is inserted into the plates 107 so that the swelled portions 111 are engaged with locking pieces 108 of the clips 104.

In fitting the front grill 101 to the clips 104, however, the lower parts of the plates 107 are pushed downward by the flange portion 110 as shown with a dotted line in FIG. 7 when the swelled portions 111 are engaged with locking pieces 108. As a result, the fitting position of the front grill 101 is inclined downwardly with respect to the front panel 102, thus making positioning difficult in fastening with screws 105 and so on. Further, since the swelled portions 111 of the front grill 101 are not positioned in a lateral direction, adjustment of the fitting position is troublesome.

A related art is disclosed in Japanese Utility Model Application Laid-Open No. HEI 1-103453.

OBJECT AND SUMMARY OF THE INVENTION

It is an object of the present invention to solve the above-mentioned problems and to provide a front grill fitting structure of an automobile in which a fixed space is maintained between a front panel and a front grill so as to position the front grill easily and to fix it surely.

In order to solve the above-mentioned problems, the present invention provides that, in a front grill fitting structure of an automobile in which clips are installed on an inner face of an upper part of an opening hole formed on a front panel and an upper part of a front grill is fitted to these clips, each clip is composed of U-shaped plates having a pair of opposite faces, a projected part projecting to the inner face side on either one of the opposite faces is formed, and engagement holes which are engaged with the projected parts are formed on the upper face of the front grill.

Then, the order of fitting the front grill is that clips are installed first on an inner face of the upper part of the opening hole of the front panel. When the front grill is fitted, the upper face of the front grill is inserted between mutual opposite faces of the clips. The engagement holes of the front grill are engaged with the projected portions provided on the opposite surfaces of the clips so as to be positioned.

According to a front grill fitting structure of an automobile of the present invention, clips fix the front grill without deformation. Thus, it is possible to position the front grill surely. Since the projected parts of the clips engage with the engagement holes of the front grill, positioning of the front grill in front and in the rear and right and left can be performed easily. It is possible to position the front grill surely and to maintain a space from the front panel uniform because no play is produced between the front grill and the clips.

BRIEF DESCRIPTION OF THE DRAWINGS

FIG. 3 (b) is a side view of FIG. 2;

FIG. 6 and FIG. 7 show a conventional front grill fitting structure, in which FIG. 6 is a perspective view of a front grill and FIG. 7 is a sectional view taken along a line 7—7 in FIG. 6;

DETAILED DESCRIPTION OF THE PREFERRED EMBODIMENTS

An embodiment of the present invention will be described in detail hereafter with reference to the drawings.

Figure 1:
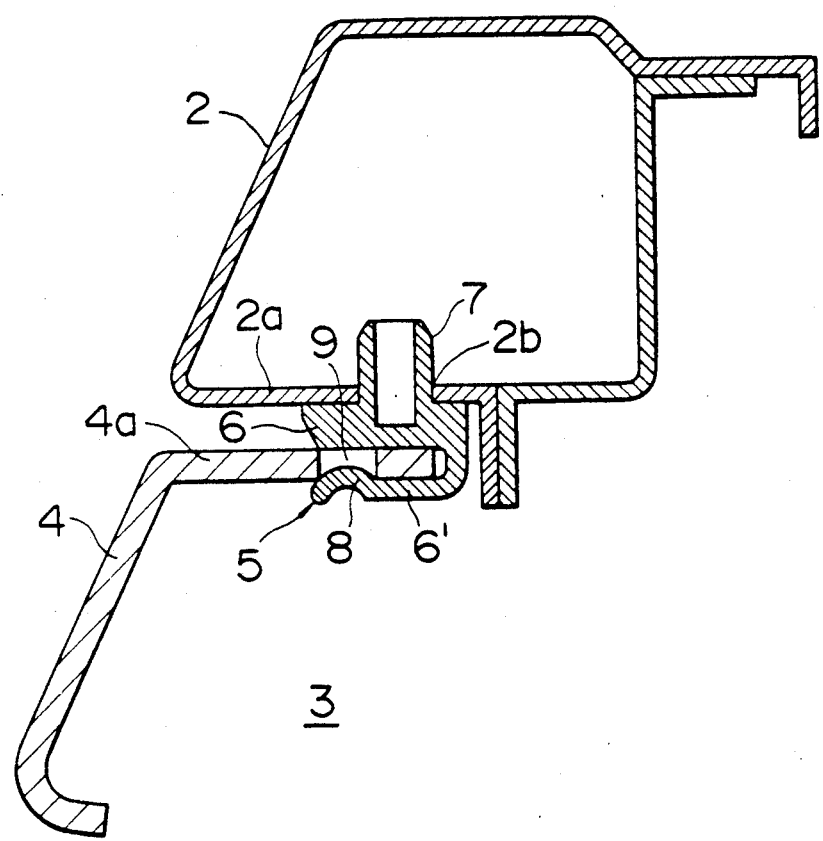
FIG. 1 is a sectional view taken along line 1—1 of FIG. 4 showing a front grill fitting structure of an automobile according to an embodiment of the present invention.
Figure 2:
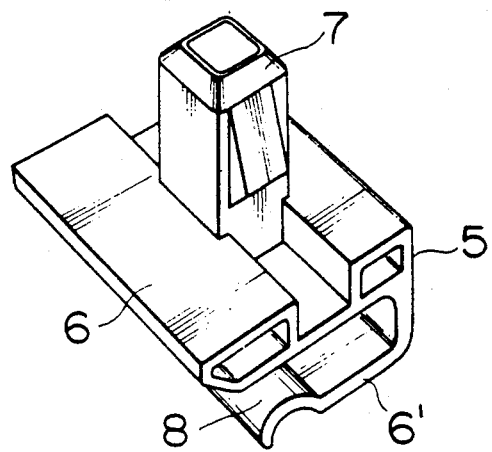
FIG. 2 is a perspective view showing a clip shown in cross section in FIG. 1.
Figure 3A:
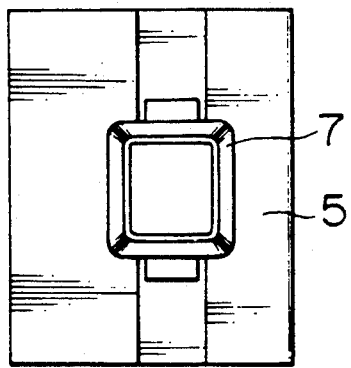
FIG. 3 (a) is a plan view of FIG. 2.
Figure 3B:
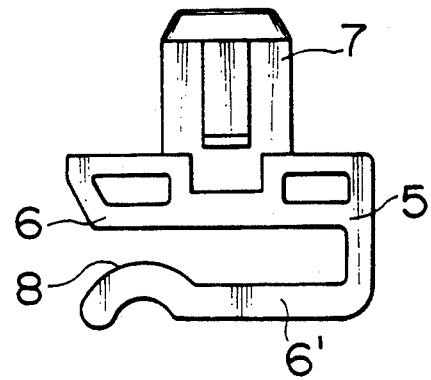
Figure 4:
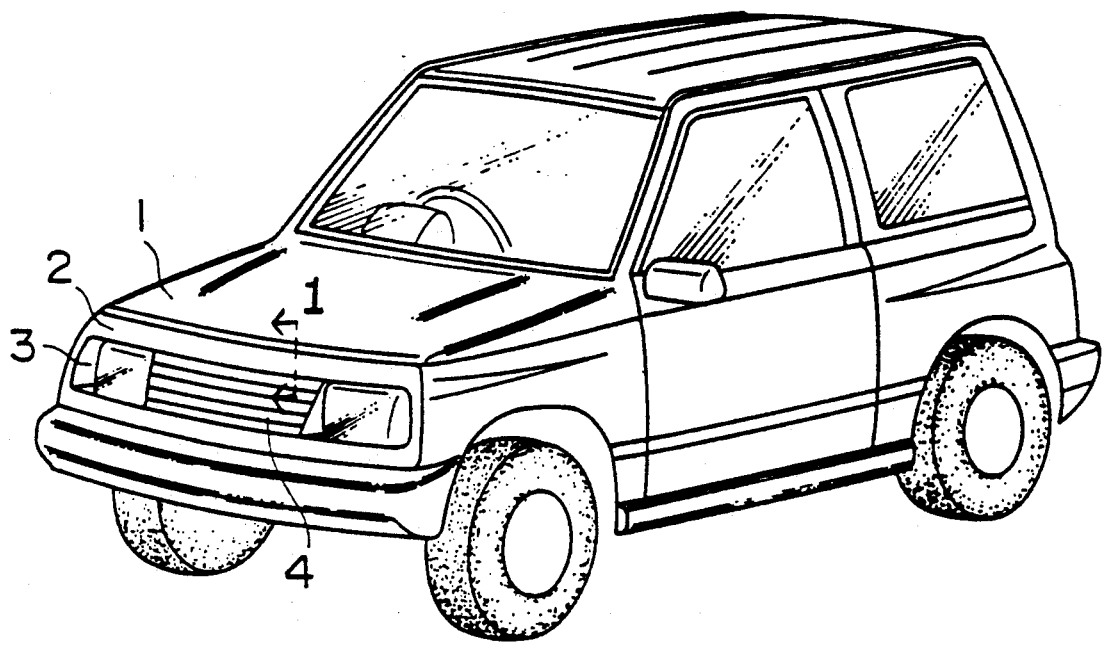
FIG. 4 is a perspective view showing a car body of an automobile with front grill fitting structure according to the invention.
Figure 5:
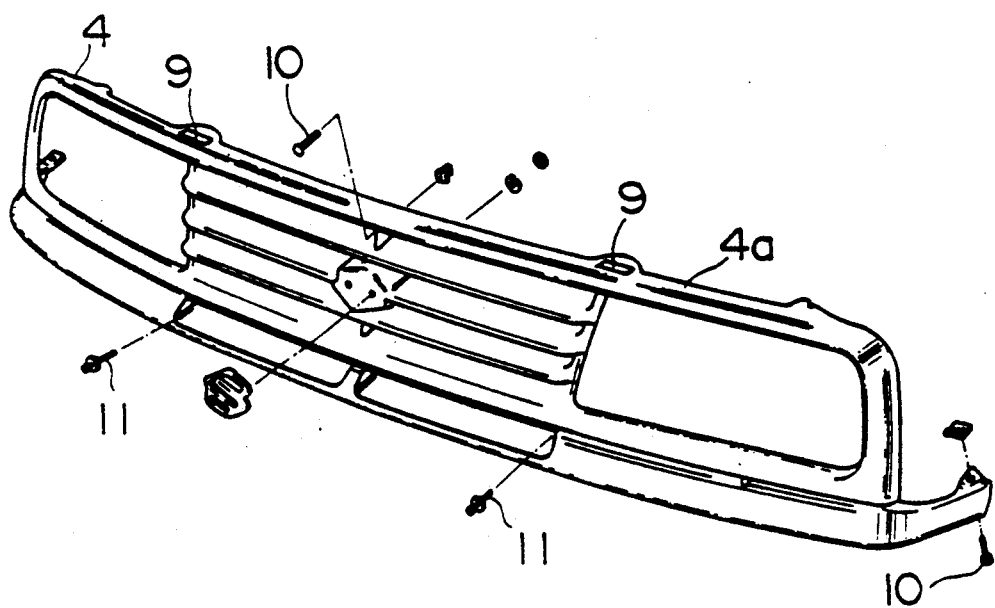
FIG. 5 is a perspective view showing a front grill of FIG. 1.
Figure 6:
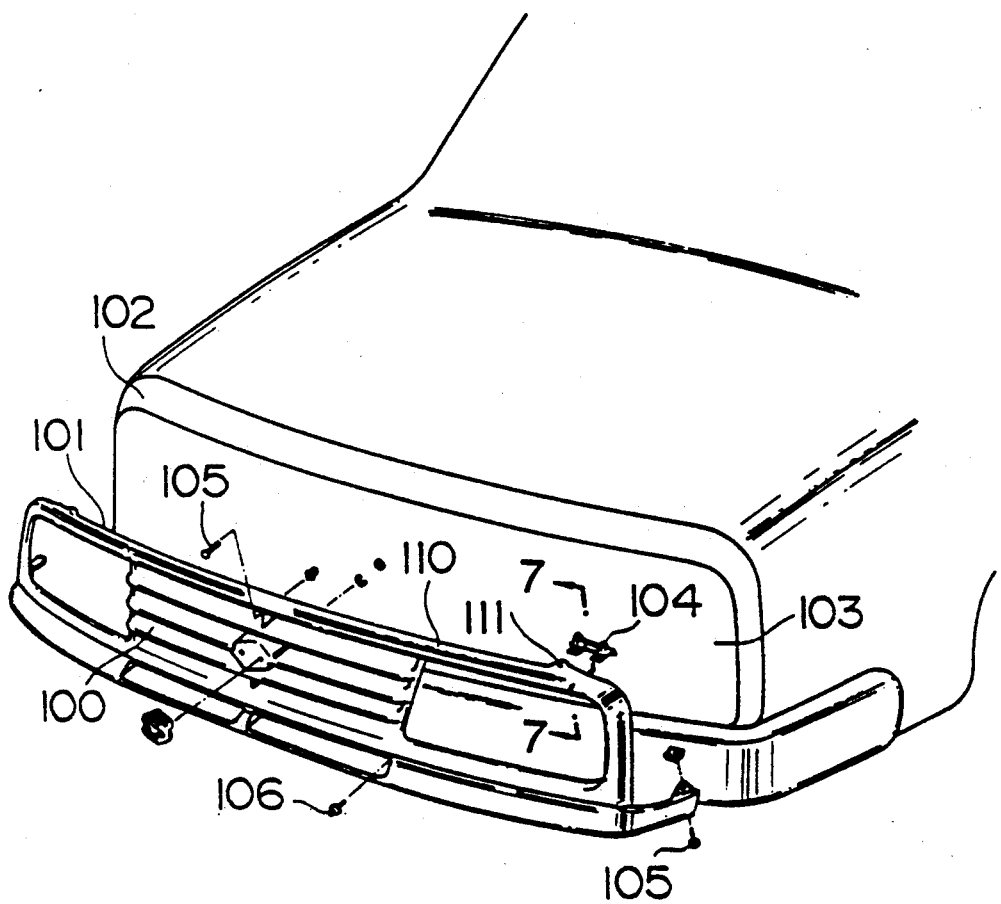
Figure 7:
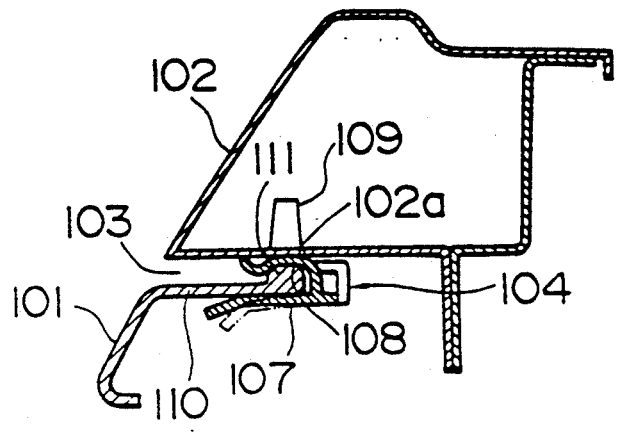
Figure 8:
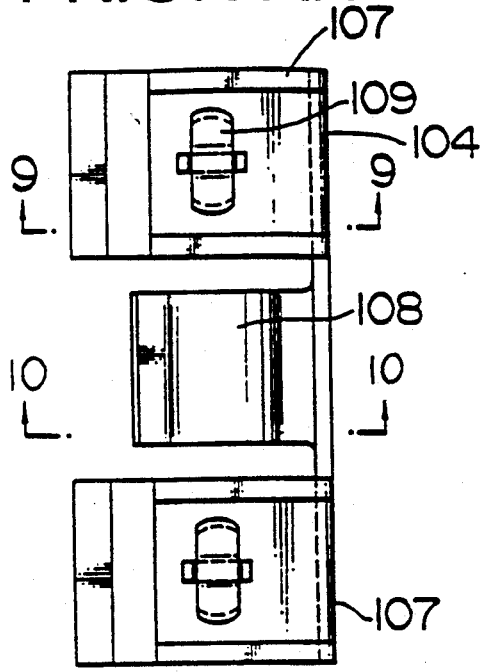
FIG. 8 is a plan view showing a clip in FIG. 6.
Figure 9:
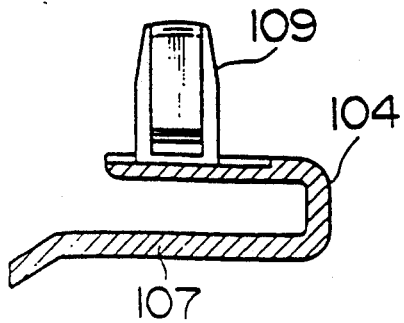
FIG. 9 is a sectional view taken along a line 9—9 in FIG. 8.
Figure 10:
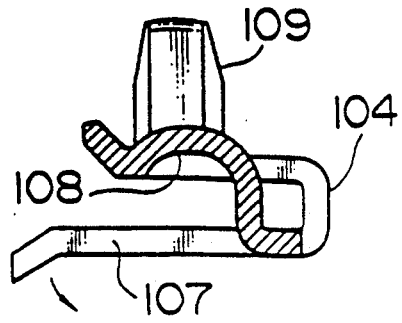
FIG. 10 is a sectional view taken along a line 10—10 in FIG. 8.
Figure 11:
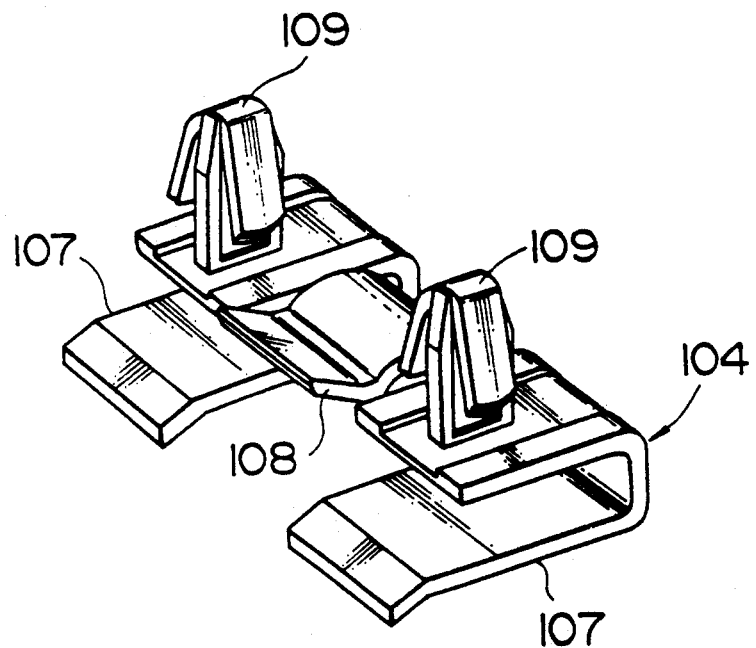
FIG. 11 is a perspective view showing a clip shown in FIG. 6.

In FIG. 1 thru FIG. 5, an opening hole 3 is formed in front of a front panel 2 in a car body 1 of an automobile, and a front grill 4 is installed at the opening hole 3. Clips 5 are installed on an inner face of the upper part on both right and left sides of the opening hole 3 of the front panel 2, respectively. The clip 5 is a U-shaped member made of synthetic resin for instance having a pair of plates 6 and 6' which are opposite to each other at a fixed interval vertically, and an engagement protected part 7 for fixing is provided on an external face of the upper plate 6. The clip 5 is fitted by inserting the engagement projected part 7 into a fitting hole 2b formed on an upper face 2a in the opening hole 3 of the front panel 2, and a projected part 8 having a circular arc form is formed in a longitudinal direction on an upper face of the lower plate 6'.

An engagement hole 9, which accords with the projected part 8, is formed on a flange part 4a on the upper face of the front grill 4, and the upper part of the front grill 4 is installed by having this engagement hole 9 engage with the projected part 8.

The engagement hole 9 has a substantially vertical axis. The front grill 4 is fastened with screws to the front panel 2 through screws 10 at the upper central part and lower both end parts, and is installed onto the front panel 2 with clips 11 at two locations of the lower central part.

When the upper flange part 4a is inserted between the plates 6 and 6' of the clip 5 in fitting of the front grill 4, the engagement hole 9 fits into the projected part 8, and the front grill 4 is thus fixed at the upper part thereof. Then, the front grill 4 is fixed by fastening the screws 10 and the clips 11 to the front panel 2.

According to above-mentioned embodiment, the front grill 4 is positioned by the engagement of the engagement hole 9 with the projected part 8 of the clip 5 in fitting the front grill 4. Accordingly, it is possible to fit the front grill 4 to the set position of the front panel 2 easily.

What is claimed is:

1. A front grill fitting structure of an automobile, the front grill fitting structure comprising: a front panel defining a grill opening and including an inner upper surface defining a fixing hole; a front grill positioned in said grill opening, said front grill including an upper flange, said upper flange defining an engaging hole; and at least one clip for holding said upper flange of said front grill to position the front grill for fastening the front grill to said front panel via screws, said at least one clip including an upper plate and a lower plate, said lower plate facing said upper plate, a rear plate connecting said upper plate and said lower plate, said lower plate including an arc-shaped projection formed on an upper surface of said lower plate, said at least one clip including an engaging portion extending from an upper surface of said upper plate, said engaging portion engaging said fixing hole for fixing said at least one clip with respect to said front panel, said upper flange of said front grill being inserted between said upper and lower plates, said arc-shaped projection projecting into said front grill engaging hole.

2. A front grill fitting structure of an automobile, the front grill fitting structure comprising: a front panel defining a front grill opening, said front panel including an inner upper surface defining a hole; a positioning clip including an upper plate, a lower plate, and a rear plate, said upper plate facing said lower plate and said upper plate having an engaging portion positioned in said fixing hole for fixing said clip relative to said front panel with said upper and lower plates extending substantially horizontally defining an opening facing a front of the automobile and said upper plate abutting said inner upper surface, said lower plate including an arc-shaped projection formed on an upper surface of said lower plate; a front grill including an upper flange defining a substantially horizontal upper flange opening, said upper flange being inserted between said upper and lower plates, said arc-shaped projection projecting into said front grill upper flange opening to position said front grill and hold said front grill; and screws for fastening said front grill to said front panel while said front panel is held positioned by said clip.

* * * * *